Patented June 29, 1948

2,444,361

UNITED STATES PATENT OFFICE 2,444,361

REFRACTORY ARTICLE

Harry W. McQuaid, Shaker Heights, Ohio, assignor to Republic Steel Corporation, Cleveland, Ohio, a corporation of New Jersey No Drawing. Application July 6, 1945,
Serial No. 603,580

6 Claims. (Cl. 106—63)

The present invention relates generally to articles made from clay containing material and more particularly to articles such as hot tops, tiles, structural shapes and the like, having new properties and characteristics and composed of dried and burned mixtures of granulated blast furnace slag and clay.

Articles, such as hot tops, tiles, structural shapes and the like, have heretofore been made by mixing finely divided clay with enough water to make it of a consistency suitable for extrusion thru a die or forming into the desired shape in a mold. The extruded material was cut into the desired lengths and such articles or the pressed articles were then dried and burned. The drying operation was carried out at a temperature sufficiently high to drive out moisture but not high enough to drive off the water of crystallization of the clay. This operation consumed considerable time. Then the dried articles were burned, that is heated at a higher temperature and the water of crystallization was driven off. This operation also took considerable time. The articles warped and shrunk during drying and burning and were thus not of uniform size or shape in their final manufactured condition. They were dense and heavy and tended to spall when subjected to varying temperatures, atmospheric conditions and loads. Also, they did not possess great resistance to shocks and were subject to heat checking when exposed to high temperatures.

I have discovered that if articles, including hot tops, tile, structural shapes and the like, are made from a mixture of clay and granulated blast furnace slag in suitable proportions, the articles will possess new, surprising and commercially quite valuable properties and characteristics.

Granulated blast furnace slag is made by bringing water into contact with blast furnace slag while in a molten condition and in such a manner that the slag is solidified in the form of porous pieces. This granulated slag differs from the ordinary "dump" slag which air cools in a mass and is dense and substantially non-porous. The mixture of granulated slag and clay is more easily extruded thru a die than clay alone and for this reason it may be said that the granulated slag has a lubricating effect on the mixture or die. This effect is unexpected and is quite valuable commercially because it facilitates extrusion of the mixture thru the die.

Articles embodying the present invention possess the property of drying and burning much more rapidly than when composed of clay alone. Apparently the porous nature of the granulated slag facilitates the removal of the water from the mixture during the drying and burning operations. I have found that when approximately equal proportions of granulated slag and clay are used the normal drying and burning times are each reduced by about 50%. With smaller amounts of the slag the reduction in drying and burning times is nearly as much as 50%.

I have also found that refractory articles made from a mixture of this slag and clay have a normal shrinkage which is considerably less than that of articles composed of the clay alone. For example, articles composed of clay alone normally shrink to the extent of from about 10% to about 12% during drying and burning, while similar articles composed of equal parts of granulated blast furnace slag and clay shrink only to the amount of 1% to 2%. This amount of shrinkage does not vary to a marked extent with changes in the proportions of slag and clay within the limits hereinafter stated. Articles embodying the present invention do not warp to any appreciable extent during drying and burning and this fact, coupled with the low shrinkage of these articles, makes it possible to produce articles which are substantially uniform in size and shape.

Due to the porosity of the granulated slag in articles embodying the present invention, these articles are considerably lighter in weight than those composed of clay alone. For example, when about equal parts of the slag and clay are used, the articles are about 15% lighter in weight than the clay articles. With smaller amounts of slag the saving in weight is less while with larger amounts of slag the saving is greater. This saving in weight is directly reflected in lower freight charges and in greater ease in handling.

Another and important property traceable to the presence of the slag is that articles embodying the present invention have improved heat insulating properties which are quite valuable in articles such as hot tops where a reduced rate of heat transfer is desirable. These insulating properties are believed to be traceable to the granular internal structure of the articles which is, in turn, traceable to the presence of the slag. It is believed that this granular internal structure is also partly responsible for the more rapid elimination of moisture from the articles during the drying and burning operations, and for the fact that there is little tendency for the surfaces of the articles to crack during the burning operation.

It has been found that articles embodying the present invention possess much less tendency toward spalling when subjected to varying temperature and atmospheric conditions. Such articles have been found to be more resistant to shock than articles composed of clay alone and this property is important because it reduces the amount of breakage during shipping and handling. These articles also have greater resistance to cracking and spalling when subjected to high temperatures than do corresponding articles made of clay alone. Hot tops embodying the present invention are less likely to crack and spall with resultant breakouts and loss of molten metal, and this characteristic is quite valuable, as those skilled in the art will readily appreciate.

Structural shapes, tile and the like, can be made in much longer lengths from the present composition than is possible with clay alone. For example, articles which are as much as six feet in length may be made from this composition as compared with the maximum length of clay products which is on the order of three or four feet.

In carrying out the present invention granulated blast furnace slag in sizes not in excess of about ¼ inch is mixed with clay and enough water is added to make an extrudable mass. This mass is extruded thru a suitable die and cut into the desired lengths, after which these lengths are dried and later burned in the ordinary manner. Then they are ready for use.

Preferably, about equal amounts of the granulated slag and the clay are used in making the aforesaid mixture, but the slag may range from about 20% to about 70% of the mixture when tile and structural shapes are being made, and may range from about 40% to about 55% when hot tops are being made. The remainder of the mixture consists of clay, that is, when the slag constitutes 20% of the mixture the clay constitutes 80% of it; and when the slag amounts to 70% of the mixture the clay is present to the extent of 30%.

It will be understood that as the percentage of the slag is decreased from about 50%, the weight of the resulting articles increases somewhat but without much increase in the drying and burning times or warpage, or much increase in the amount of shrinkage, or much decrease in the lubricating qualities of the mixture. Similarly, when the amount of slag is increased above about 50% the weight and shrinkage are decreased somewhat without much change in the drying and burning times, warpage, or lubricating qualities. Since the slag acts as a heat insulator, hot tops embodying the present invention should contain from about 40% to about 55% of the slag. Amounts of slag less than about 40% do not provide the maximum amount of heat insulation.

Any of the clays which have been used or are usable in making tiles, structural shapes and the like may be mixed with granulated blast furnace slag to make such articles embodying this invention. Similarly any of the fire clays which have been used or are usable in making hot tops may be mixed with the slag to make hot tops embodying this invention.

Since all the above mentioned articles are subjected to and resist high heat during the burning operation they may be collectively referred to as refractory articles.

It will be seen from the foregoing disclosure that the present invention utilizes slag which is largely waste material at the present time and substitutes this waste material for part of the valuable clay; that this combination of materials has the unexpected property of lubricating extrusion dies and that articles made from this new composition possess many new and unexpected properties, characteristics and advantages.

Having thus described my invention so that others skilled in the art may be able to understand and practice the same, I state that what I desire to secure by Letters Patent is defined in what is claimed.

What is claimed is:

1. An article consisting of a dried and burned mixture of from about 20% to about 70% of granulated blast furnace slag and clay.

2. A refractory article consisting of a dried and burned mixture of from about 40% to about 55% of granulated blast furnace slag and fire clay.

3. A refractory article consisting of approximately equal parts of granulated blast furnace slag and fire clay.

4. An article consisting of a dried and burned mixture of granulated blast furnace slag in sizes up to about ¼ inch and clay.

5. A hot top consisting of from about 40% to about 55% of granulated blast furnace slag in sizes up to about ¼ inch and fire clay.

6. A refractory hot top consisting of about 50% of granulated blast furnace slag in sizes up to about ¼ inch and about 50% of fire clay.

HARRY W. McQUAID.

REFERENCES CITED

The following references are of record in the file of this patent:

UNITED STATES PATENTS

| Number | Name | Date |
|---|---|---|
| 314,802 | Clinchard | Mar. 31, 1886 |
| 385,694 | Blaszkaye | July 10, 1888 |
| 485,917 | Elbers | Nov. 8, 1892 |
| 1,786,713 | Greenawalt | Dec. 30, 1930 |